US012720343B2

(12) United States Patent
Muñoz De La Torre Alonso et al.

(10) Patent No.: US 12,720,343 B2
(45) Date of Patent: Aug. 25, 2026

(54) TECHNIQUE FOR COLLECTING ANALYTICS DATA

(71) Applicant: Telefonaktiebolaget LM Ericsson (publ), Stockholm (SE)

(72) Inventors: Miguel Angel Muñoz De La Torre Alonso, Madrid (ES); Zaheduzzaman Sarker, Järfälla (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 411 days.

(21) Appl. No.: 18/279,514

(22) PCT Filed: Jun. 14, 2021

(86) PCT No.: PCT/EP2021/065881
§ 371 (c)(1),
(2) Date: Aug. 30, 2023

(87) PCT Pub. No.: WO2022/194397
PCT Pub. Date: Sep. 22, 2022

(65) Prior Publication Data

US 2024/0147272 A1 May 2, 2024

(30) Foreign Application Priority Data

Mar. 18, 2021 (EP) .................................... 21382217

(51) Int. Cl.
*H04W 24/08* (2009.01)
*H04W 80/12* (2009.01)
*H04W 88/16* (2009.01)

(52) U.S. Cl.
CPC ............ *H04W 24/08* (2013.01); *H04W 80/12* (2013.01); *H04W 88/16* (2013.01)

(58) Field of Classification Search
None
See application file for complete search history.

(56) References Cited

U.S. PATENT DOCUMENTS

2007/0157307 A1* 7/2007 Katoh .................. H04L 63/105 726/14
2014/0189093 A1* 7/2014 du Toit ............... H04L 63/0823 709/224

(Continued)

FOREIGN PATENT DOCUMENTS

WO 2021001085 A1 1/2021

OTHER PUBLICATIONS

3rd Generation Partnership Project, "3rd Generation Partnership Project; Technical Specification Group Services and System Aspects; Study on enablers for network automation for the 5G System (5GS); Phase 2 (Release 17)", TR 23.700-91 V17.0.0, Dec. 2020, pp. 1-382, 3GPP.

(Continued)

*Primary Examiner* — Raqiul A Choudhury
(74) *Attorney, Agent, or Firm* — Sonoda & Kobayashi Intellectual Property Law; Sarvajit S. Patil

(57) ABSTRACT

A technique for collecting analytics data regarding application-related communication end-to-end-encrypted between a user equipment, UE, and an application server in a mobile communication system is disclosed, wherein the application-related communication is communicated via a network node of the mobile communication system, A method implementation of the technique is performed by the network node and comprises establishing (S402) an application layer communication channel between the network node and an endpoint of the application-related communication, the endpoint being one of the UE and the application server, receiving (S404) analytics data regarding the application-related communication from the endpoint via the communication channel, and forwarding (S406) the analytics data to an analytics component of the mobile communication system.

16 Claims, 13 Drawing Sheets

(56) References Cited

U.S. PATENT DOCUMENTS

| | | | | |
|---|---|---|---|---|
| 2015/0047041 | A1* | 2/2015 | Haddad | H04L 9/30 726/23 |
| 2015/0200972 | A1* | 7/2015 | Suryavanshi | H04L 63/0428 726/1 |
| 2018/0241686 | A1* | 8/2018 | Jokinen | H04L 47/26 |
| 2019/0268797 | A1* | 8/2019 | Pang | H04L 47/125 |
| 2021/0250251 | A1* | 8/2021 | Fan | H04L 41/0816 |

OTHER PUBLICATIONS

3rd Generation Partnership Project, "3rd Generation Partnership Project; Technical Specification Group Services and System Aspects; Architecture enhancements for 5G System (5GS) to support network data analytics services (Release 16)", TS 23.288 V16.6.0, Dec. 2020, pp. 1-67, 3GPP.

3rd Generation Partnership Project, "3rd Generation Partnership Project; Technical Specification Group Services and System Aspects; Study on enablers for network automation for the 5G System (5GS); Phase 2 (Release 17)", TR 23.700-91 V1.0.0, Sep. 2020, pp. 1-304, 3GPP.

* cited by examiner

Fig. 2
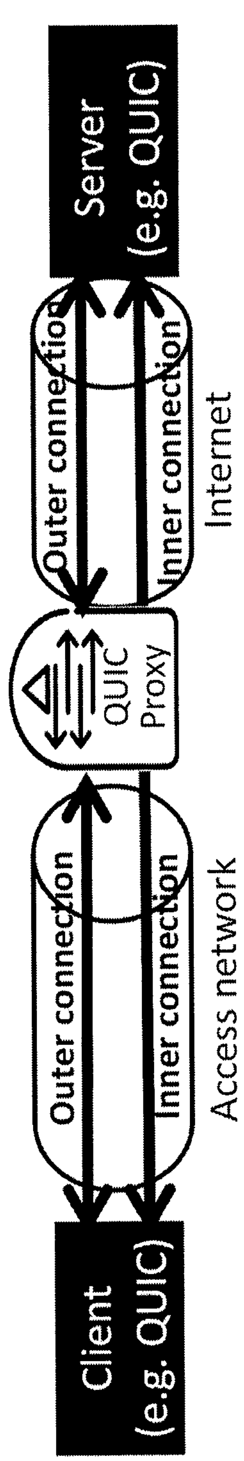

Computing unit (network node)
Processor
Memory
302
304
300

Computing unit (analytics component)
Processor
Memory
312
314
310

Computing unit (endpoint)
Processor
Memory
322
324
320

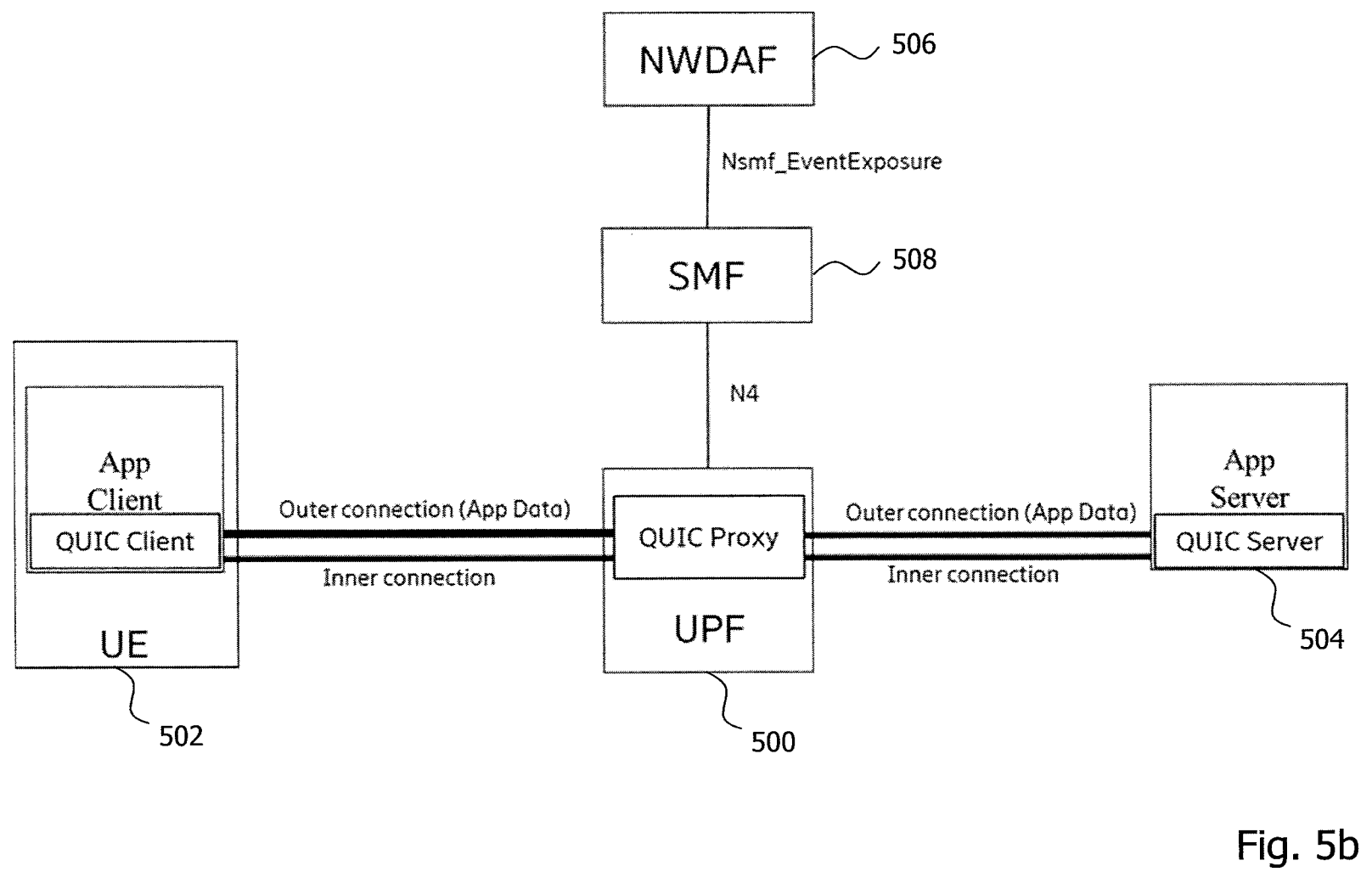

NWDAF
506
Nsmf_EventExposure
SMF
508
N4
QUIC Proxy
UPF
500
Outer connection (App Data)
Inner connection
App Server
QUIC Server
504
Outer connection (App Data)
Inner connection
App Client
QUIC Client
UE
502

Fig. 5b

Figure 6:
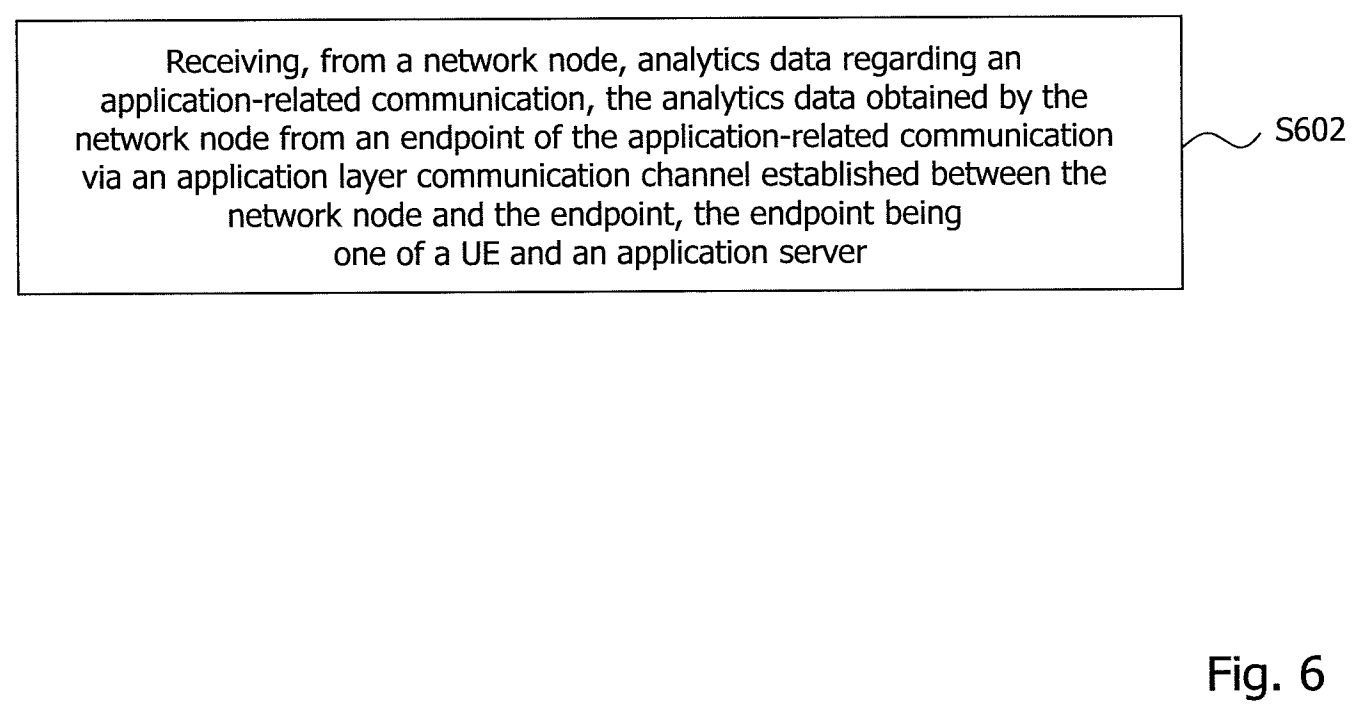

Receiving, from a network node, analytics data regarding an application-related communication, the analytics data obtained by the network node from an endpoint of the application-related communication via an application layer communication channel established between the network node and the endpoint, the endpoint being one of a UE and an application server

TECHNIQUE FOR COLLECTING ANALYTICS DATA

TECHNICAL FIELD

The present disclosure generally relates to mobile communication systems. In particular, a technique for collecting analytics data regarding application-related communication end-to-end-encrypted between a user equipment (UE) and an application server in a mobile communication system is presented. The technique may be embodied in methods, computer programs, apparatuses and systems.

BACKGROUND

Modern mobile communication systems, such as mobile communication systems of the fourth generation (4G) or the fifth generation (5G) are generally based on the control and user plane separation (CUPS) architecture in which user plane and control plane nodes are separated from each other, wherein the user plane is dedicated to carrying user traffic while the control plane is dedicated to carrying control signaling in the network.

FIG. 1 illustrates an exemplary architecture of a 5G network where the user plane carries traffic exchanged between application servers running in a data network (DN) and a UE, wherein next generation NodeBs (gNBs) operating as base stations of a radio access network (RAN) as well as a user plane function (UPF) operating as a gateway node of the network represent user plane nodes. The UPF supports handling of user plane traffic, including packet inspection and different enforcement actions, such as traffic steering, quality of service (QoS) handling and charging, for example. The other nodes shown in FIG. 1 represent control plane nodes of the network, including an access and mobility management function (AMF) responsible for e.g. authentication, authorization and mobility management, a session management function (SMF) responsible for e.g. session management and the selection and control of the UPF, a charging function (CHF) enabling charging services to be offered to authorized network functions (NFs) of the 5G network, a policy control function (PCF) responsible for policy control to support QoS management, an application function (AF) providing e.g. information on packet flows to the PCF, a unified data repository (UDR) usable e.g. by the PCF to store policy related data, and a network exposure function (NEF) exposing services and capabilities of the NFs of the network. In the control plane, the 5G network may further comprise a network data analytics function (NWDAF) which provides operator managed network analytics functionality. The NWDAF may interact with different entities in the network for different purposes, including data collection based on event subscription (e.g., collecting data provided by the AMF, SMF, PCF, AF (directly or via NEF), unified data management (UDM) and operations, administration and maintenance (OAM)), retrieval of information from data repositories (e.g., retrieval from the UDR via UDM for subscriber-related information), and retrieval of information about NFs (e.g., retrieval from a network repository function (NRF) for NF-related information and/or retrieval from a network slice selection function (NSSF) for slice-related information). The NWDAF may process the collected data to obtain analytics results and provide the analytics results to consumers on demand, for example.

Nowadays, there is a trend to increasing use of traffic encryption on the user plane, making it more and more difficult to correlate exposure information with a corresponding user's data traffic. This applies to applications that communicate using the QUIC (quick user datagram protocol (UDP) internet connections) protocol, for example. QUIC is a UDP based stream-multiplexed and secure transport protocol supporting integrity protected headers and encrypted payload. Unlike the traditional transport protocol stack using the transmission control protocol (TCP), which resides in the operating system kernel, QUIC can be implemented in user space, i.e., on the application layer. This improves flexibility in terms of transport protocol evolution with the implementation of new features, such as congestion control and deployment ability and adoption, for example. QUIC is currently undergoing standardization by the internet engineering task force (IETF) and may become the main transport protocol in the Internet's user plane, including the user plane of mobile communication systems. It may be expected that many applications that today run mainly over the hypertext transfer protocol (HTTP) or the hypertext transfer protocol secure (HTTPS) will migrate to QUIC, driven by latency improvements and stronger security requirements, for example. Compared to HTTPS, encryption in QUIC covers both the transport protocol headers as well as the payload, as opposed to transport layer security (TLS) over TCP (e.g., HTTPS), which only protects the payload. Techniques building upon QUIC include multiplexed application substrate over QUIC encryption (MASQUE) developed by a new IETF Working Group, for example, which aims at developing mechanisms that allow configuring and concurrently running multiple proxied stream-based and datagram-based flows inside an HTTPS connection (e.g., through the specification of corresponding HTTP and/or HTTP/3 extensions).

An exemplary proxy technology is collaborative performance enhancement (COPE). A COPE node (or "function") is a proxy entity which resides between two endpoints that use encrypted communication, usually between a client and server in a client/server setup or between peers in a peer-to-peer communication setup. A communicating party (usually the client) explicitly contacts the proxy in order to request a network-support service which, at a minimum, includes forwarding the encrypted traffic to the other party (usually the server), e.g., in cases where the server is otherwise not directly reachable. In addition, the endpoints may share traffic information with the COPE node such that the node can execute a requested performance enhancement function, e.g., improving QoS of the traffic and optimizing other operations within the network. The COPE node can also provide additional information about the network, enabling the endpoints to optimize their data transfer, such as by using optimized congestion control or delay pre-fetching activities, for example.

Typically, a client learns about the existence of a COPE service either directly from the access network or based on other communication with a peer. When a COPE node is detected, the client may open a connection to it (e.g., a QUIC connection when QUIC is used as transport protocol) and request a service. The communication with the server is realized using an inner transport connection that is end-to-end-encrypted between the client and the server. FIG. 2 illustrates an exemplary COPE setup including an application client and an application server interaction using a QUIC proxy acting as COPE node. The client and/or server explicitly contacts the proxy in order to expose information between the content provider (i.e., the provider of the application client and/or the application server, such as a YouTube providing a YouTube app executed on a UE as well as a YouTube application server) and the mobile network operator (exposed information may be accessible to the mobile network operator through the UPF, for example, when the QUIC proxy is executed at the UPF). As shown in FIG. 2, application traffic end-to-end-encrypted between the client and the server (not visible to the proxy) is carried via an inner connection, while an outer connection may be used to expose information between the content provider (client/server) and the mobile network operator (proxy at UPF). In a COPE setup, an application client may thus create a secure connection to an on-path network proxy (outer connection) and establish a secure end-to-end connection to the server via the proxy (inner connection), by which application data is secured in an end-to-end fashion to protect it from unauthorized use in the network. The content provider and the mobile network operator may use the outer connection to exchange information about the application in real-time. To create the outer connection, the application time may open a QUIC tunnel connection to the proxy and use an HTTP CONNECT-like protocol and/or a custom protocol to request or negotiate forwarding, authentication and configuration, for example. The QUIC proxy may provide secure forwarding and performance enhancement services, such as congestion control support (mobile/satellite), access policy enforcement, load balancing/mobility, and multi-hop chaining/onion routing, for example. The QUIC proxy may additionally open a QUIC tunnel to the server (if supported by the server).

Encryption generally prevents known exposure mechanisms from detecting and classifying traffic. Especially with respect to an NWDAF used to support network data analytics services in a 5G core network (CN), there is currently no efficient mechanism that supports data collection from the content provider (i.e., application client and/or server). 3GPP TR 23.700-91 has identified in this regard the following Key Issue #8: "UE data as an input for analytics generation", and one of the aspects to be studied as part of this issue is "How the NWDAF collects the UE's information (the method of collection of data)".

SUMMARY

Accordingly, there is a need for a technique that allows collecting analytics data from a content provider in a mobile communication system, even though application traffic between a corresponding client and server is end-to-end-encrypted.

According to a first aspect, a method for collecting analytics data regarding application-related communication end-to-end-encrypted between a UE and an application server in a mobile communication system is provided. The application-related communication is communicated via a network node of the mobile communication system. The method is performed by the network node and comprises establishing an application layer communication channel between the network node and an endpoint of the application-related communication. The endpoint is one of the UE and the application server. The method further comprises receiving analytics data regarding the application-related communication from the endpoint via the communication channel. The method further comprises forwarding the analytics data to an analytics component of the mobile communication system.

The method may further comprise receiving, prior to forwarding the analytics data, an event subscription request from the analytics component to establish an event subscription for receipt of the analytics data. Forwarding the analytics data may be performed as part of the event subscription. The event subscription request may include at least one of an event identifier identifying a type of event to be subscribed to, wherein the type of event to be subscribed to relates to exposure of analytics data regarding the application-related communication to be exposed by the endpoint, an endpoint identifier identifying the endpoint to expose the analytics data, an application identifier identifying an application associated with the application-related communication for which the analytics data is to be exposed, and an analytics data identifier identifying a type of data associated with the application-related communication that is to be exposed as the analytics data.

The method may further comprise sending, via the communication channel, an analytics data request to the endpoint to request receipt of the analytics data from the endpoint. The analytics data request may include the analytics data identifier included in the event subscription request to specify the type of data to be exposed by the endpoint as the analytics data. The communication channel may be established upon receipt of a communication channel establishment request from the endpoint. The communication channel establishment request may include at least one of an endpoint identifier identifying the endpoint, an application identifier identifying an application associated with the application-related communication for which analytics data can be exposed by the endpoint, and a capability indication indicating support for analytics data collection and, optionally, one or more types of data associated with the application-related communication that the endpoint is capable to expose as analytics data.

The communication channel may be one of a plurality of application layer communication channels established between the network node and respective endpoints. For sending the analytics data request to the endpoint, the network node may identify the communication channel by matching the endpoint identifier and the application identifier included in the communication channel establishment request with the endpoint identifier and the application identifier included in the event subscription request. The method may further comprise sending, in response to the communication channel establishment request, a capability indication to the endpoint indicating support for analytics data collection.

The communication channel may be established using a QUIC protocol. The analytics component may be an NWDAF of the mobile communication system. The network node may be a gateway node of the mobile communication system that supports an event exposure service, wherein forwarding the analytics data to the analytics component may be performed using the event exposure service. Alternatively, the network node may be a gateway node of the mobile communication system, wherein forwarding the analytics data to the analytics component may be performed via a control plane node of the mobile communication network. The method may be performed by an embedded service function (SF) executed on the network node.

According to a second aspect, a method for collecting analytics data regarding application-related communication end-to-end-encrypted between a UE and an application server in a mobile communication system is provided. The application-related communication is communicated via a network node of the mobile communication system. The method is performed by an analytics component of the mobile communication system and comprises receiving, from the network node, analytics data regarding the application-related communication. The analytics data is obtained by the network node from an endpoint of the application-related communication via an application layer communication channel established between the network node and the endpoint. The endpoint is one of the UE and the application server.

The method according to the second aspect may define a method from the perspective of an analytics component described above in relation to the method according to the first aspect. As in the method of the first aspect, the method may further comprise sending, prior to receiving the analytics data, an event subscription request to the network node to establish an event subscription for receipt of the analytics data. Receiving the analytics data may be performed as part of the event subscription. The event subscription request may include at least one of an event identifier identifying a type of event to be subscribed to, wherein the type of event to be subscribed to relates to exposure of analytics data regarding the application-related communication to be exposed by the endpoint, an endpoint identifier identifying the endpoint to expose the analytics data, an application identifier identifying an application associated with the application-related communication for which the analytics data is to be exposed, and an analytics data identifier identifying a type of data associated with the application-related communication that is to be exposed as the analytics data. The analytics data identifier included in the event subscription request may be dedicated to be included in an analytics data request sent from the network node to the endpoint to specify the type of data to be exposed by the endpoint as the analytics data.

The communication channel may be one of a plurality of application layer communication channels established between the network node and respective endpoints. For sending the analytics data request to the endpoint, the endpoint identifier and the application identifier included in the event subscription request may be dedicated to be used by the network node to identify the communication channel by matching the endpoint identifier and the application identifier included in the event subscription request with an endpoint identifier and an application identifier included in a communication channel establishment request received by the network node from the endpoint. Sending the event subscription request to the network node may be triggered by a consumer request received by the analytics component from a consumer entity of the mobile communication system. The method may in this case further comprise applying analytics processing to the analytics data received from the network node to obtain an analytics result in accordance with the consumer request, and forwarding the analytics result to the consumer entity.

The communication channel may be established using a QUIC protocol. The analytics component may be an NWDAF of the mobile communication system. The network node may be a gateway node of the mobile communication system that supports an event exposure service, wherein receiving the analytics data from the network node may be performed using the event exposure service. Alternatively, the network node may be a gateway node of the mobile communication system, wherein receiving the analytics data from the network node may be performed via a control plane node of the mobile communication network. Functions performed by the network node as part of the method may be performed by an embedded SF executed on the network node.

According to a third aspect, a method for collecting analytics data regarding application-related communication end-to-end-encrypted between a UE and an application server in a mobile communication system is provided. The application-related communication is communicated via a network node of the mobile communication system. The method is performed by an endpoint of the application-related communication. The endpoint is one of the UE and the application server. The method comprises establishing an application layer communication channel between the network node and the endpoint. The method further comprises obtaining analytics data regarding the application-related communication. The method further comprises sending the analytics data to the network node via the communication channel. The analytics data is to be forwarded by the network node to an analytics component of the mobile communication system.

The method according to the third aspect may define a method from the perspective of an endpoint described above in relation to the method according to the first aspect. As in the method of the first aspect, the method may further comprise receiving, via the communication channel, an analytics data request from the network node to request receipt of the analytics data from the endpoint. The analytics data request may include an analytics data identifier obtained by the network node from the analytics component to specify the type of data to be exposed by the endpoint as the analytics data. The communication channel may be established upon sending a communication channel establishment request to the network node. The communication channel establishment request may include at least one of an endpoint identifier identifying the endpoint, an application identifier identifying an application associated with the application-related communication for which analytics data can be exposed by the endpoint, and a capability indication indicating support for analytics data collection and, optionally, one or more types of data associated with the application-related communication that the endpoint is capable to expose as analytics data.

The communication channel may be one of a plurality of application layer communication channels established between the network node and respective endpoints. For sending the analytics data request by the network node to the endpoint, the endpoint identifier and the application identifier included in the communication channel establishment request may be dedicated to be used by the network node to identify the communication channel by matching the endpoint identifier and the application identifier included in the communication channel establishment request with an endpoint identifier and an application identifier obtained by the network node from the analytics component. The method may further comprise receiving, in response to the communication channel establishment request, a capability indication from the network node indicating support for analytics data collection.

The communication channel may be established using a QUIC protocol. The analytics component may be an NWDAF of the mobile communication system. The network node may be a gateway node of the mobile communication system that supports an event exposure service, wherein forwarding the analytics data to the analytics component may be performed using the event exposure service. Alternatively, the network node may be a gateway node of the mobile communication system, wherein forwarding the analytics data to the analytics component may be performed via a control plane node of the mobile communication network. Functions performed by the network node as part of the method may be performed by an embedded SF executed on the network node.

According to a fourth aspect, a computer program product is provided. The computer program product comprises program code portions for performing the method of at least one of the first, the second and the third aspect when the computer program product is executed on one or more computing devices (e.g., a processor or a distributed set of processors). The computer program product may be stored on a computer readable recording medium, such as a semiconductor memory, DVD, CD-ROM, and so on.

According to a fifth aspect, a computing unit a configured to execute a network node of a mobile communication system for collecting analytics data regarding application-related communication end-to-end-encrypted between a UE and an application server in a mobile communication system is provided. The application-related communication is communicated via the network node. The computing unit comprises at least one processor and at least one memory, the at least one memory containing instructions executable by the at least one processor such that the network node is operable to perform any of the method steps presented herein with respect to the first aspect.

According to a sixth aspect, a computing unit configured to execute an analytics component of a mobile communication system for collecting analytics data regarding application-related communication end-to-end-encrypted between a UE and an application server in a mobile communication system is provided. The application-related communication is communicated via a network node of the mobile communication system. The computing unit comprises at least one processor and at least one memory, the at least one memory containing instructions executable by the at least one processor such that the analytics component is operable to perform any of the method steps presented herein with respect to the second aspect.

According to a seventh aspect, a computing unit configured to execute an endpoint of an application-related communication for collecting analytics data regarding the application-related communication is provided. The application-related communication is end-to-end-encrypted between a UE and an application server in a mobile communication system. The application-related communication is communicated via a network node of the mobile communication system. The endpoint is one of the UE and the application server. The computing unit comprises at least one processor and at least one memory, the at least one memory containing instructions executable by the at least one processor such that the endpoint is operable to perform any of the method steps presented herein with respect to the third aspect.

According to an eighth aspect, there is provided a system comprising a computing unit of the fifth aspect, a computing unit of the seventh aspect, and a computing unit of the sixth aspect.

BRIEF DESCRIPTION OF THE DRAWINGS

Implementations of the technique presented herein are described herein below with reference to the accompanying drawings, in which:

FIG. 2 illustrates an overview of an exemplary COPE setup including a client/server interaction and a QUIC proxy acting as COPE node;

FIGS. 5*a* and 5*b* illustrate exemplary implementations in which the network node corresponds to a UPF with an integrated QUIC proxy;

FIG. 6 illustrates a method which may be performed by the analytics component according to the present disclosure;

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more application specific integrated circuits (ASICs) and/or using one or more digital signal processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figures 3A, 3B, 3C:
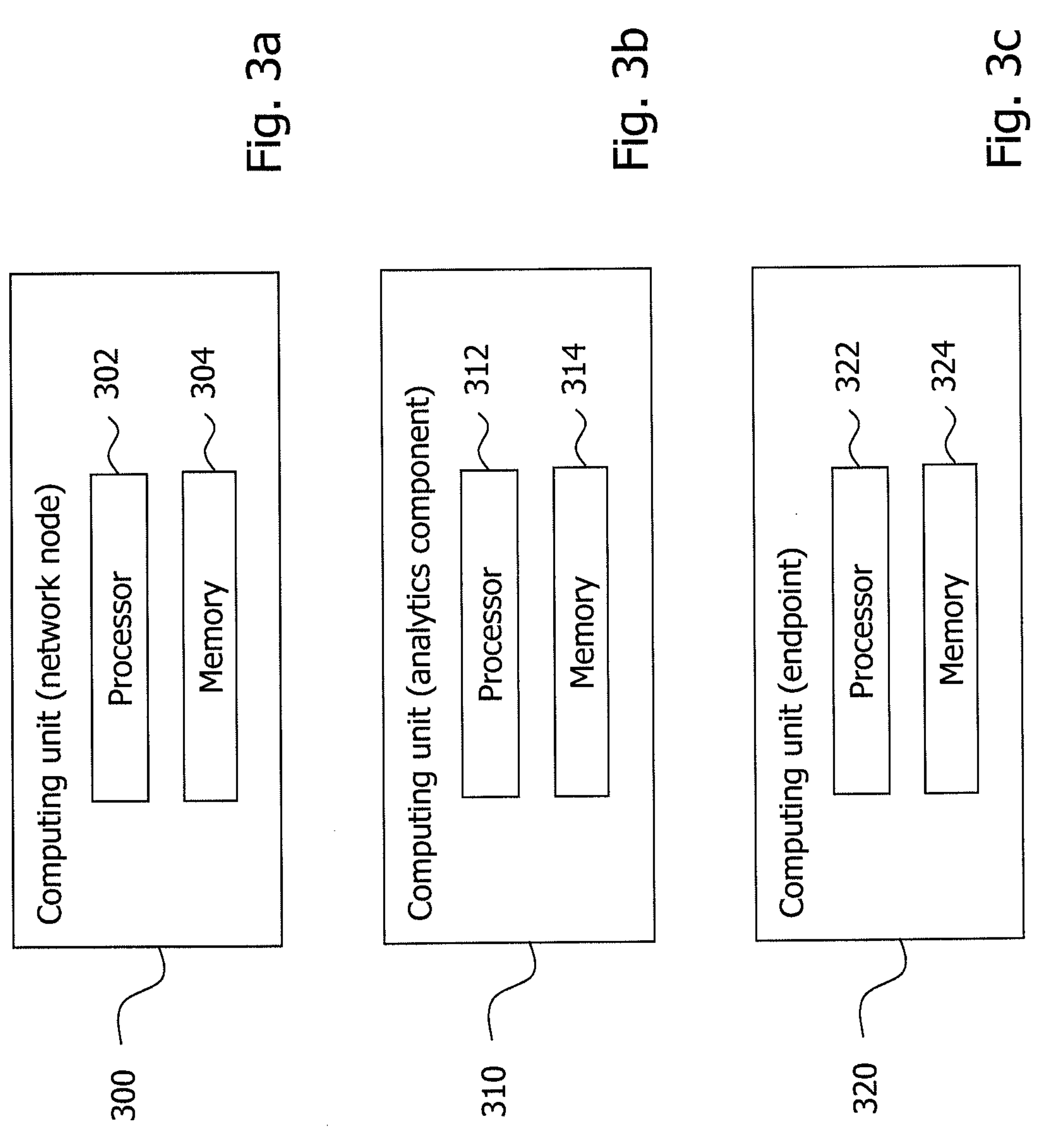
FIGS. 3*a* to 3*c* illustrate exemplary compositions of a computing unit configured to execute a network node, a computing unit configured to execute an analytics component, and a computing unit configured to execute an endpoint according to the present disclosure.

FIG. 3*a* schematically illustrates an exemplary composition of a computing unit 300 configured to execute a network node of a mobile communication system for collecting analytics data regarding application-related communication end-to-end-encrypted between a UE and an application server in a mobile communication system, wherein the application-related communication is communicated via the network node. The computing unit 300 comprises at least one processor 302 and at least one memory 304, wherein the at least one memory 304 contains instructions executable by the at least one processor 302 such that the network node is operable to carry out the method steps described herein below with reference to the network node.

FIG. 3*b* schematically illustrates an exemplary composition of a computing unit 310 configured to execute an analytics component of a mobile communication system for collecting analytics data regarding application-related communication end-to-end-encrypted between a UE and an application server in a mobile communication system, wherein the application-related communication is communicated via a network node of the mobile communication system. The computing unit 310 comprises at least one processor 312 and at least one memory 314, wherein the at least one memory 314 contains instructions executable by the at least one processor 312 such that the analytics component is operable to carry out the method steps described herein below with reference to the analytics component.

FIG. 3*c* schematically illustrates an exemplary composition of a computing unit 320 configured to execute an endpoint of an application-related communication for collecting analytics data regarding the application-related communication. The application-related communication is end-to-end-encrypted between a UE and an application server in a mobile communication system, wherein the application-related communication is communicated via a network node of the mobile communication system, and wherein the endpoint is one of the UE and the application server. The computing unit 320 comprises at least one processor 322 and at least one memory 324, wherein the at least one memory 324 contains instructions executable by the at least one processor 322 such that the endpoint is operable to carry out the method steps described herein below with reference to the endpoint.

It will be understood that each of the computing unit 300, the computing unit 310 and the computing unit 320 (in case the endpoint is the application server) may be implemented on a physical computing unit or a virtualized computing unit, such as a virtual machine, for example. It will further be appreciated that each of the computing unit 300, the computing unit 310 and the computing unit 320 may not necessarily be implemented on a standalone computing unit, but may be implemented as components—realized in software and/or hardware—residing on multiple distributed computing units as well, such as in a cloud computing environment, for example.

Figure 4:
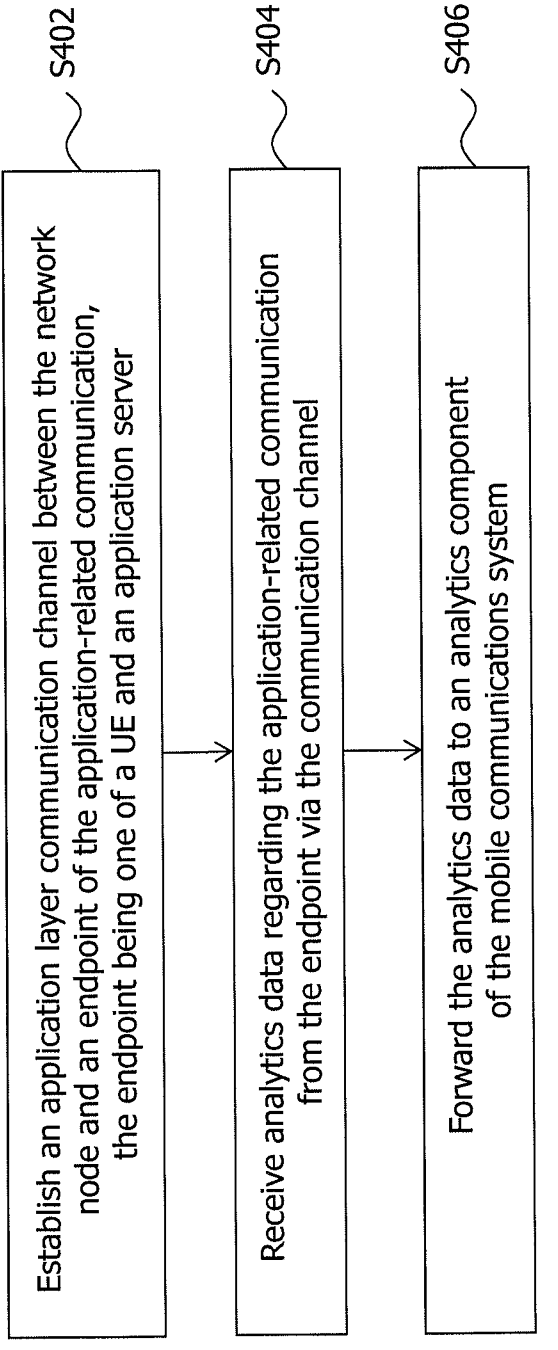
FIG. 4 illustrates a method which may be performed by the network node according to the present disclosure.

FIG. 4 illustrates a method which may be performed by the network node executed on the computing unit 300 according to the present disclosure. The method is dedicated to collecting analytics data regarding application-related communication end-to-end-encrypted between a UE and an application server in a mobile communication system. In step S402, the network node may establish an application layer communication channel between the network node and an endpoint (e.g., the endpoint executed on the computing unit 320) of the application-related communication, the endpoint being one of the UE and the application server. In step S404, the network node may receive analytics data regarding the application-related communication from the endpoint via the communication channel. In step S406, the network node may forward the analytics data to an analytics component (e.g., the analytics component executed on the computing unit 310) of the mobile communication system.

The application-related communication end-to-end-encrypted between the UE and the application server may be communicated through an end-to-end-encrypted application layer communication channel established between the UE and the application server, wherein the application-related communication (e.g., the application data (or "traffic") being exchanged between the UE and the application server) may not be visible to the network node. The end-to-end-encrypted application layer communication channel established between the UE and the application server may herein also be denoted as an "inner connection" and may correspond to an "inner connection" in the sense described above with respect to a conventional COPE setup. The network node may as such correspond to a COPE node, for example. The network node—via which the application-related communication may be transferred—may forward application data exchanged between the UE and the application server accordingly. The network node may as such function as a proxy, i.e., as an intermediary entity which passes on messages (or packets) exchanged between the UE and the application server. As will be appreciated by one of skill in the art, the application layer may be a layer above the transport layer and the network layer of the communication protocol stack. The end-to-end-encrypted application layer communication channel may be established using an application client running on the UE that is about to communicate with the application server, for example.

Since the application-related communication transferred on the inner connection may not be visible to the network node, and in order to enable the network node to collect analytics data regarding the application-related communication, an additional application layer communication channel may be established between the network node and an endpoint of the application-related communication in accordance with step S402. The application layer communication channel between the network and the endpoint may herein also be denoted as an "outer connection" and may correspond to an "outer connection" in the sense described above with respect to the conventional COPE setup. The endpoint of the application-related communication may be the UE (e.g., comprising an application client running on the UE as the actual endpoint, as mentioned above) or the application server. If the endpoint is the UE, an outer connection may be established between the network node and the UE, and the outer connection may be used for exposure of information from the UE (e.g., the application client) to the network node. Likewise, if the endpoint is the application server, an outer connection may be established between the network node and the application server, and the outer connection may be used for exposure of information from the application server to the network node. It will be understood that outer connections may also be established between the network node and both endpoints to enable exposure of information from both the UE and the application server. The exposed information may be analytics data which is to be provided from the content provider (the application client running on the UE and/or the application server) to the network operator (more specifically, to the network node, which may be operated by the network operator). As a mere example, the application server may be a YouTube application server and the application client may be a YouTube app installed on the UE, YouTube being the content provider. The analytics data may correspond to any data associated with the application-related communication between the UE and the application server that is collected for the purpose of performing analytics by an analytics component of the mobile communication system.

Each outer connection may be end-to-end-encrypted between the network node and the respective endpoint, so that the network node may decrypt the encrypted traffic received from the endpoint. Unlike the application-related communication which is communicated through the inner connection, the exposed information provided through an outer connection may thus be visible to the network node, and the network node may hence forward the received data in clear text to the analytics component. Again, in step S404, the network node may receive analytics data regarding the application-related communication from the endpoint via the communication channel and, in step S406, the received analytics data may be forwarded to an analytics component of the mobile communication system. In this way, collection and processing of analytics data by an analytics component of a mobile communication system may be enabled for application-related data originating from a content provider (application client and/or application server), even though the application traffic between the client and server may be end-to-end-encrypted.

The collection of analytics data may be triggered (or "ordered") by the analytics component, e.g., in the form of an event subscription requested by the analytics component. The method performed by the network node may thus further comprise receiving, prior to forwarding the analytics data, an event subscription request from the analytics component to establish an event subscription for receipt of the analytics data. Forwarding the analytics data in accordance with step S406 may then be performed as part of the event subscription. Setting up the event subscription may be implemented using an event exposure service available in the mobile communication system, e.g., involving an NEF of a 5G network, for example. The network node itself may be a service-based function, such as a service-based UPF in case of a 5G network, for example, which may support an Nupf_EventExposure service, e.g., with a new event type, such as "ApplicationExposure", for example. The event subscription may be set up in accordance with at least one parameter specifying the type and origin of the analytics data to be collected. To this end, the event subscription request may include at least one of an event identifier identifying a type of event to be subscribed to, wherein the type of event to be subscribed to may relate to exposure of analytics data regarding the application-related communication to be exposed by the endpoint (e.g., "Event-ID" set to ApplicationExposure), an endpoint identifier identifying the endpoint to expose the analytics data (e.g., "UE-ID" identifying the UE, such as by a user/subscriber identity), an application identifier identifying an application associated with the application-related communication for which the analytics data is to be exposed (e.g., "App-ID" identifying the application of the content provider, e.g., YouTube), and an analytics data identifier identifying a type of data associated with the application-related communication that is to be exposed as the analytics data (e.g., "App-Data" specifying the type of application-related data to be collected, e.g., the application's measured quality of experience (QoE)). It will be understood that, by parameters like the UE-ID and App-ID, analytics data collection from the application client and/or application server may be triggered on a per user and on a per application basis.

Upon receiving the event subscription request from the analytics component, the network node may itself order (or "trigger") receipt of the analytics data from the endpoint specified in the event subscription request. The method performed by the network node may thus further comprise sending, via the communication channel (i.e., the established outer connection), an analytics data request to the endpoint to request receipt of the analytics data from the endpoint, wherein the analytics data request may include the analytics data identifier (e.g., App-Data) included in the event subscription request to specify the type of data to be exposed by the endpoint as the analytics data. The network node may in other words implement the event subscription request with the concerned endpoint.

To be able to identify the appropriate endpoint among several potential endpoints, endpoints available in the mobile communication system may indicate their analytics data collection capabilities to the network node to enable the network node to select a proper endpoint upon receiving the event subscription request from the analytics component. Such a capabilities indication may be transferred via the outer connection established with the respective endpoint, such as at the time of establishing the corresponding outer connection, for example. In one variant, the communication channel may thus be established upon receipt of a communication channel establishment request from the endpoint, wherein the communication channel establishment request may include at least one of an endpoint identifier identifying the endpoint (e.g., UE-ID), and application identifier identifying an application associated with the application-related communication for which analytics data can be exposed by the endpoint (e.g., App-ID), and a capability indication indicating support for analytics data collection and, optionally, one or more types of data associated with the application-related communication that the endpoint is capable to expose as analytics data (e.g., App-Data=measured QoE).

Such information may be stored by the network node and may be used by the network node later on to select an appropriate endpoint by matching the parameters included in an event subscription request received from the analytics component. This may be necessary when a plurality of endpoints have established respective outer connections with the network node. Thus, in one variant, the communication channel (i.e., the established outer connection) may be one of a plurality of application layer communication channels (outer connections) established between the network node and respective endpoints, wherein, for sending the analytics data request to the endpoint, the network node may identify the communication channel by matching the endpoint identifier (e.g., UE-ID) and the application identifier (e.g., App-ID) included in the communication channel establishment request with the endpoint identifier (e.g., UE-ID) and the application identifier (e.g., App-ID) included in the event subscription request. It will be understood that, upon receipt of a communication channel establishment request from an endpoint, the network node may respond with its own capability indication to inform the endpoint accordingly, such as indicating that the network node also supports analytics data collection, for example. In this way, both ends of the outer connection may know their respective capabilities. The method performed by the network node may thus further comprise sending, in response to the communication channel establishment request, a capability indication to the endpoint indicating support for analytics data collection.

Once the outer connection is established with the endpoint, the network node may receive the requested analytics data from the endpoint and forward the analytics data to the analytics component in accordance with steps S404 and S406. The analytics component may apply analytic processing on the analytics data in order to obtain a corresponding analytics result. The analytics result may then be provided to a consumer entity (e.g., consumer NF) of the mobile communication system, such as a consumer entity which initially triggered the analytics data collection by sending a corresponding consumer request to the analytics component. From the viewpoint of the analytics component, the event subscription request sent to the network node may thus be triggered by a consumer request received by the analytics component from a consumer entity of the mobile communication system, and the analytics component may apply analytics processing to the analytics data received from the network node to obtain an analytics result in accordance with the consumer request and forward the analytics result to the consumer entity. The consumer entity may then take one or more actions on the basis of the received analytics result. As a mere example, if the analytics result indicates that the QoE associated with the application-related communication is below a target QoE (e.g., as agreed per a service level agreement (SLA)), the consumer entity may trigger a policy action aiming to improve the corresponding QoE.

To be able to establish the communication channel with the network node on application level (i.e., between the endpoint and the network node), the endpoint may need to know the network address (e.g., the internet protocol (IP) address) of the network node. The endpoint may thus be informed about the network address needed to reach the network node and, therefore, the method performed by the network node may further comprise sending a network address indicative of the network node to the endpoint, wherein the endpoint, when it starts establishing the outer connection, may send the communication channel establishment request to the network address. If the endpoint is the UE, the network address may be provided from the network node to the UE via a control plane node of the mobile communication system, optionally as part of a data session establishment procedure carried out in the mobile communication system for the UE, for example. In a 5G network, such data session establishment procedure may correspond to a protocol data unit (PDU) session establishment procedure, as part of which the network address may be provided to the UE, for example. The UE may thus receive the network address from the control plane node via non-access stratum (NAS) signaling. For example, the network address may be provided from the network node to an SMF of a 5G network which may forward the network address to the UE, optionally via an AMF.

As is apparent from the above, the network node may function as an intermediary entity between the analytics component and respective endpoints to act as proxy and implement a subscription for receipt of analytics data by the analytics component from the respective endpoints. Such capability may be communicated by the network node, prior to establishing the outer connection between the network node and the endpoint, to a control plane node of the mobile communication system responsible for selecting network nodes for the communication between the UE and the application server. The method performed by the network node may thus further comprise sending, prior to establishing the outer connection between the network node and the endpoint, a capability indication to a control plane node of the mobile communication system for use in selecting a network node for the communication between the UE and the application server, the capability indication indicating that the network node supports acting as intermediary entity (or "proxy") to implement subscriptions for receipt of analytics data by the analytics component from respective endpoints. As an example, if the network node is a gateway node of the mobile communication system, such as a UPF of a 5G network or a PGW-U or TDF-U of a 4G network, for example, the gateway node may inform the control plane node, such as an SMF of a 5G network or a PDN gateway control function (PGW-C) or traffic detection function control plane function (TDF-C) of a 4G network, for example, of the gateway node's capability of acting as corresponding intermediary entity. The control plane node may then consider this information when selecting a gateway node for the communication between the UE and the application server.

Figure 1:
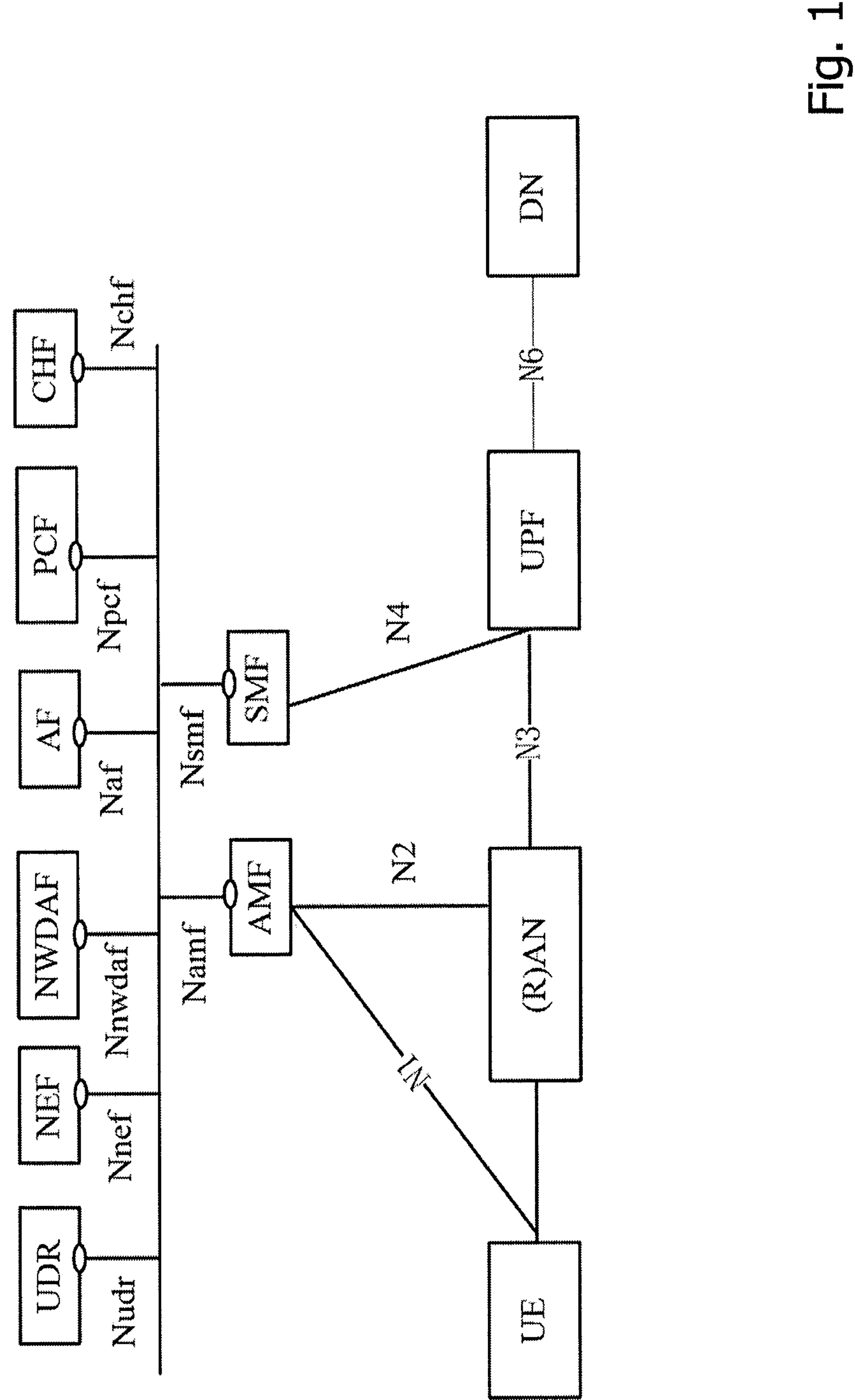
FIG. 1 illustrates an overview of a general 3GPP reference architecture of 5G systems.

The mobile communication system may be a 4G network or a 5G network, for example, but it will be understood that the principles of the technique presented herein may likewise be employed with other types of mobile communication systems. The application server may be provided in a DN connected to the mobile communication system, as explained above with reference to FIG. 1. The network node may be any network node of the mobile communication system via which the application-related communication may be transferred, in particular, a network node of a CN of the mobile communication system. In one variant, the communication channel may be established using a QUIC protocol. The network node may in this case be (or "act as") a QUIC proxy, for example. The analytics component may be an NWDAF of the mobile communication system, e.g., in case of a 5G network. In one variant, the network node may be a gateway node of the mobile communication system, such as a UPF of a 5G network or a packet data network (PDN) gateway user plane function (PGW-U) or traffic detection function user plane function (TDF-U) of a 4G network, for example. The network node may be a (e.g., service-based) gateway node of the mobile communication system that supports an event exposure service (such as a gateway node in a 5G service based architecture (SBA), or a gateway node in a 4G architecture or any future architecture to come), wherein forwarding the analytics data to the analytics component may be performed using the event exposure service. Alternatively, the network node may be a gateway node of the mobile communication system, wherein forwarding the analytics data to the analytics component may be performed via a control plane node of the mobile communication network (e.g., an SMF in a 5G network). The function as an intermediary entity (or "proxy") described herein, such as the function of a QUIC proxy, as mentioned above, may be implemented in the form of an SF, wherein, in one variant, the SF may be implemented as an embedded SF (e.g., an SF embedded in the network node). In another variant, the SF may be implemented as an SF external to a network node, such as a gateway node of the mobile communication system (e.g., a UPF), for example. In one such variant, the method may thus be performed by an embedded SF executed on the network node.

Figure 5A:
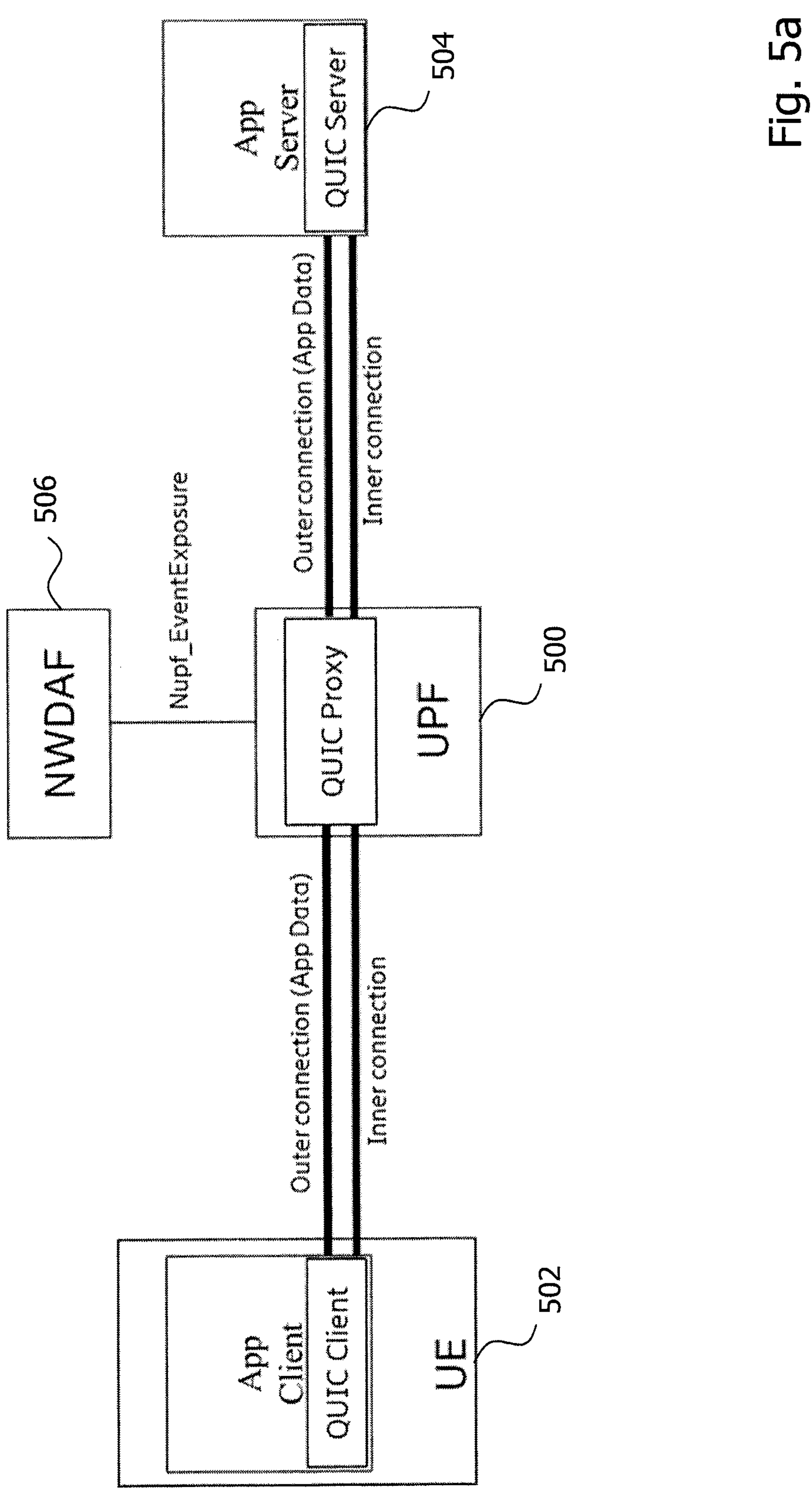

Such variants are exemplarily illustrated in FIGS. 5*a* and 5*b*. FIG. 5*a* illustrates an exemplary implementation in which the network node 500 corresponds to a UPF having an integrated QUIC proxy configured to carry out the method presented herein. The UPF may act as gateway between a UE 502 and an application server 504 and may also act as a QUIC proxy which forwards analytics data to an analytics component 506 (exemplified by an NWDAF) via an event exposure service. Rather than an integrated QUIC proxy, as shown in the figure (i.e., a QUIC proxy that is directly integrated into the UPF without implementation as an SF), the QUIC proxy could, in another variant, also be provided in the form of an SF, such as an embedded SF or an SF external to the UPF, for example. Implementing the QUIC proxy as an embedded SF may especially be suitable for an implementation into Ericsson's packet core gateway (PCG) product in order to leverage service chaining capabilities. FIG. 5*b*, on the other hand, illustrates an implementation in which the analytics component 506 (NWDAF) may trigger the analytics data collection through a control plane node 508 (e.g., a control plane node responsible for the selection of the gateway node) which, in the shown example, is an SMF in a 5G network. In this case, the N4 interface between the SMF and the UPF may be extended so that the SMF may request analytics data collection from the UPF, as described above.

FIG. 6 illustrates a method which may be performed by the analytics component executed on the computing unit 310 according to the present disclosure. The method is dedicated to collecting analytics data regarding application-related communication end-to-end-encrypted between a UE and an application server in a mobile communication system, wherein the application-related communication is communicated via a network node (e.g., the network node executed on computing unit 300) of the mobile communication system. The operation of the analytics component may as such be complementary to the operation of the network node described above in relation to FIG. 4 and, as such, aspects described above with regard to the operation of the analytics component may be applicable to the operation of the analytics component described in the following as well, and vice versa. Unnecessary repetitions are thus omitted in the following.

In step S602, the analytics component may receive, from the network node, analytics data regarding the application-related communication, the analytics data obtained by the network node from an endpoint of the application-related communication via an application layer communication channel established between the network node and the endpoint, the endpoint being one of the UE and the application server.

As described above in relation to FIG. 4, the method performed by the analytics component may further comprise sending, prior to receiving the analytics data, an event subscription request to the network node to establish an event subscription for receipt of the analytics data, wherein receiving the analytics data may be performed as part of the event subscription. The event subscription request may include at least one of an event identifier identifying a type of event to be subscribed to, wherein the type of event to be subscribed to relates to exposure of analytics data regarding the application-related communication to be exposed by the endpoint, an endpoint identifier identifying the endpoint to expose the analytics data, an application identifier identifying an application associated with the application-related communication for which the analytics data is to be exposed, and an analytics data identifier identifying a type of data associated with the application-related communication that is to be exposed as the analytics data. The analytics data identifier included in the event subscription request may be dedicated to be included in an analytics data request sent from the network node to the endpoint to specify the type of data to be exposed by the endpoint as the analytics data.

The communication channel may be one of a plurality of application layer communication channels established between the network node and respective endpoints, wherein, for sending the analytics data request to the endpoint, the endpoint identifier and the application identifier included in the event subscription request may be dedicated to be used by the network node to identify the communication channel by matching the endpoint identifier and the application identifier included in the event subscription request with an endpoint identifier and an application identifier included in a communication channel establishment request received by the network node from the endpoint. Sending the event subscription request to the network node may be triggered by a consumer request received by the analytics component from a consumer entity of the mobile communication system, wherein the method performed by the analytics component may further comprise applying analytics processing to the analytics data received from the network node to obtain an analytics result in accordance with the consumer request, and forwarding the analytics result to the consumer entity.

The communication channel may be established using a QUIC protocol. The analytics component may be an NWDAF of the mobile communication system. The network node may be a gateway node of the mobile communication system that supports an event exposure service, wherein receiving the analytics data from the network node may be performed using the event exposure service. Alternatively, the network node may be a gateway node of the mobile communication system, wherein receiving the analytics data from the network node may be performed via a control plane node of the mobile communication network. Functions performed by the network node as part of the method may be performed by an embedded SF executed on the network node.

Figure 7:
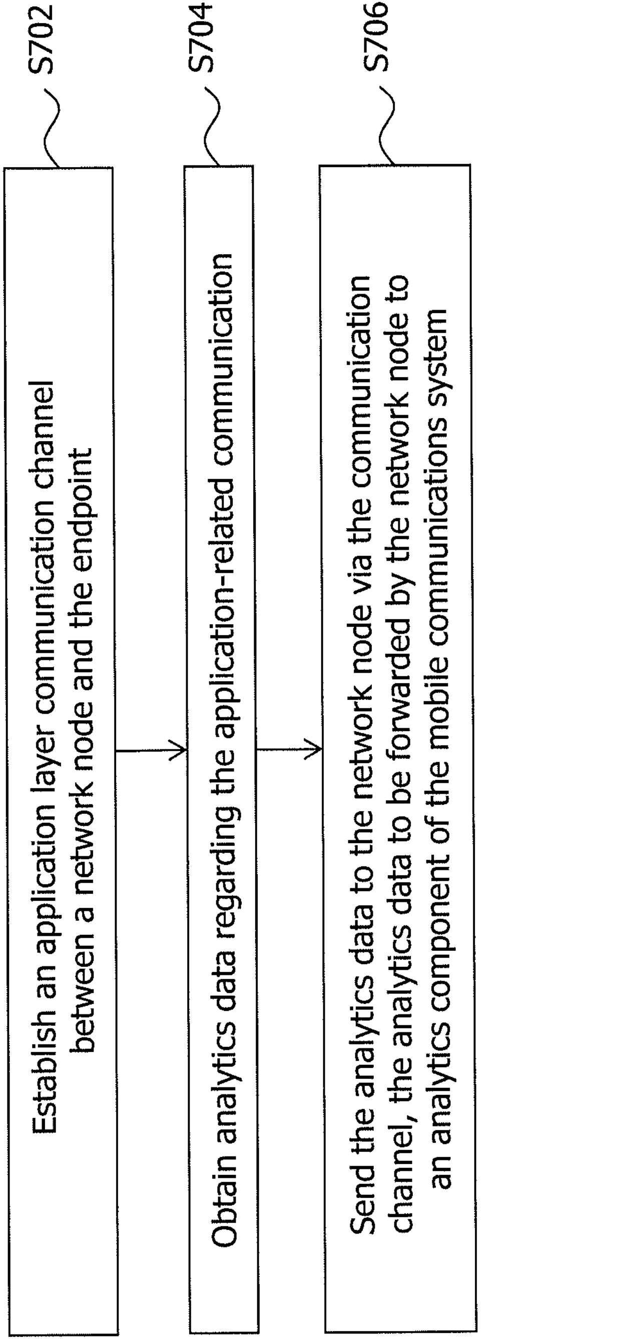
FIG. 7 illustrates a method which may be performed by the endpoint according to the present disclosure.

FIG. 7 illustrates a method which may be performed by the endpoint executed on the computing unit 320 according to the present disclosure. The method is dedicated to collecting analytics data regarding the application-related communication, wherein the application-related communication is end-to-end-encrypted between a UE and an application server in a mobile communication system, wherein the application-related communication is communicated via a network node of the mobile communication system, the endpoint being one of the UE and the application server. The operation of the endpoint may be complementary to the operation of the network node described above in relation to FIGS. 4 and 6 and, as such, aspects described above with regard to the operation of the endpoint may be applicable to the operation of the endpoint described in the following as well, and vice versa. Unnecessary repetitions are thus omitted in the following.

In step S702, the endpoint may establish an application layer communication channel between the network node and the endpoint. In step S704, the endpoint may obtain analytics data regarding the application-related communication. In step S706, the endpoint may send the analytics data to the network node via the communication channel, the analytics data to be forwarded by the network node to an analytics component of the mobile communications system.

As described above in relation to FIGS. 4 and 6, the method performed by the endpoint may further comprise receiving, via the communication channel, an analytics data request from the network node to request receipt of the analytics data from the endpoint. The analytics data request may include an analytics data identifier obtained by the network node from the analytics component to specify the type of data to be exposed by the endpoint as the analytics data. The communication channel may be established upon sending a communication channel establishment request to the network node, wherein the communication channel establishment request may include at least one of an endpoint identifier identifying the endpoint, an application identifier identifying an application associated with the application-related communication for which analytics data can be exposed by the endpoint, and a capability indication indicating support for analytics data collection and, optionally, one or more types of data associated with the application-related communication that the endpoint is capable to expose as analytics data.

The communication channel may be one of a plurality of application layer communication channels established between the network node and respective endpoints, wherein, for sending the analytics data request by the network node to the endpoint, the endpoint identifier and the application identifier included in the communication channel establishment request may be dedicated to be used by the network node to identify the communication channel by matching the endpoint identifier and the application identifier included in the communication channel establishment request with an endpoint identifier and an application identifier obtained by the network node from the analytics component. The method performed by the endpoint may further comprise receiving, in response to the communication channel establishment request, a capability indication from the network node indicating support for analytics data collection.

The communication channel may be established using a QUIC protocol. The analytics component may be an NWDAF of the mobile communication system. The network node may be a gateway node of the mobile communication system that supports an event exposure service, wherein forwarding the analytics data to the analytics component may be performed using the event exposure service. Alternatively, the network node may be a gateway node of the mobile communication system, wherein forwarding the analytics data to the analytics component may be performed via a control plane node of the mobile communication network. Functions performed by the network node as part of the method may be performed by an embedded SF executed on the network node.

Figure 8A:
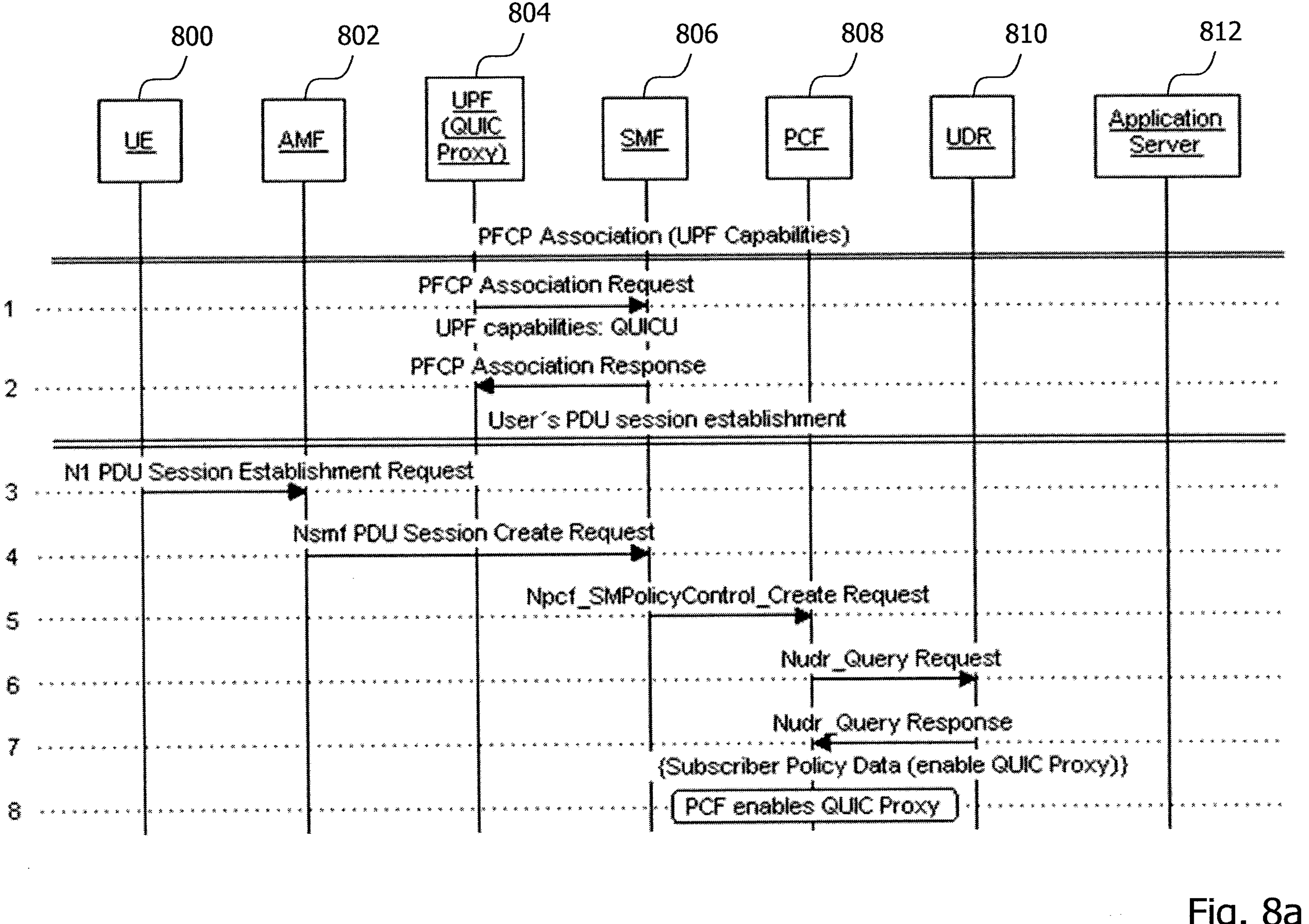
FIGS. 8*a* to 8*c* illustrate a signaling diagram of an exemplary interaction between entities of a mobile communication system according to the present disclosure focusing on an establishment of an outer connection between a UE and a UPF acting as proxy.
Figure 8B:
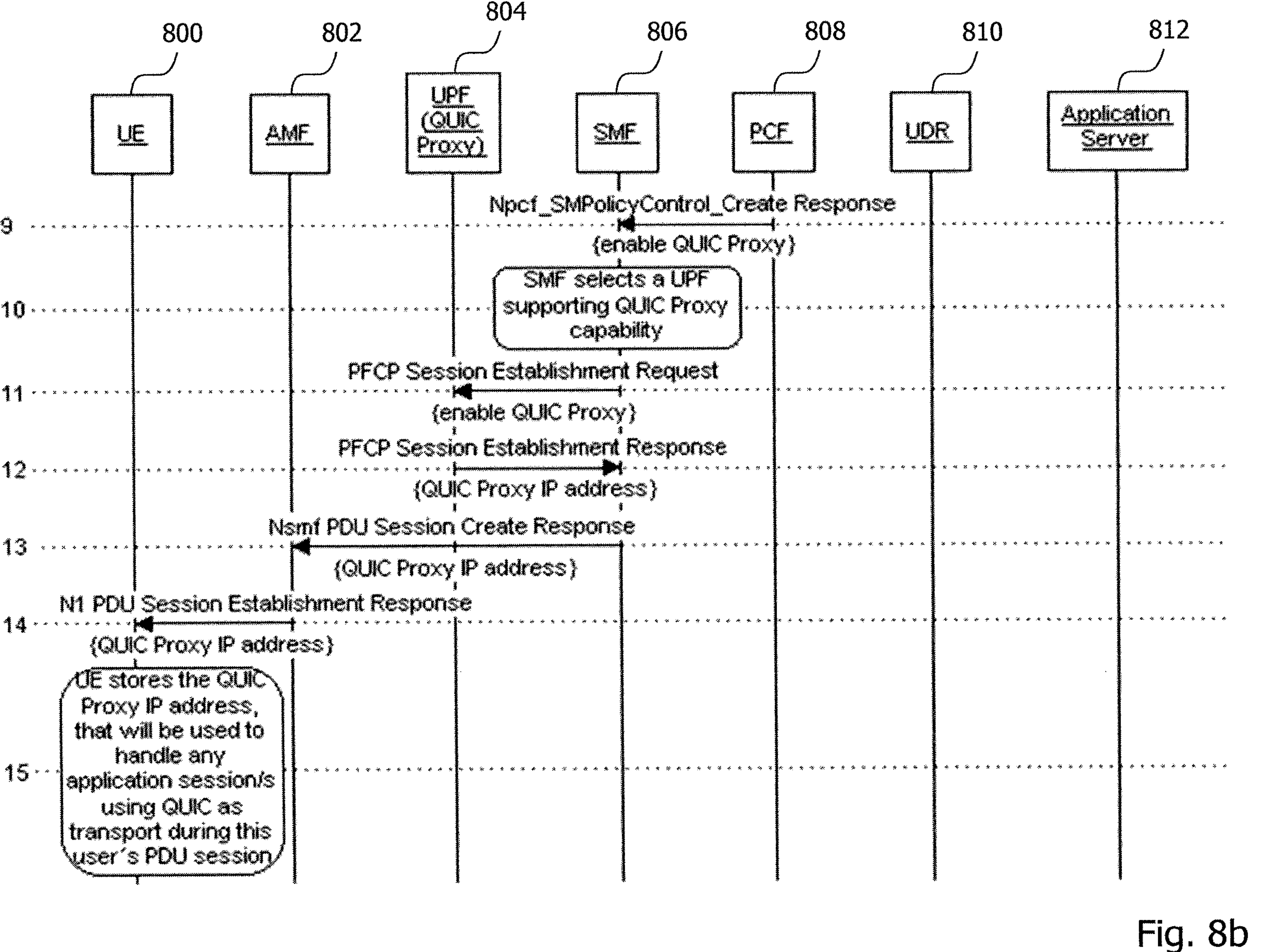
Figure 8C:
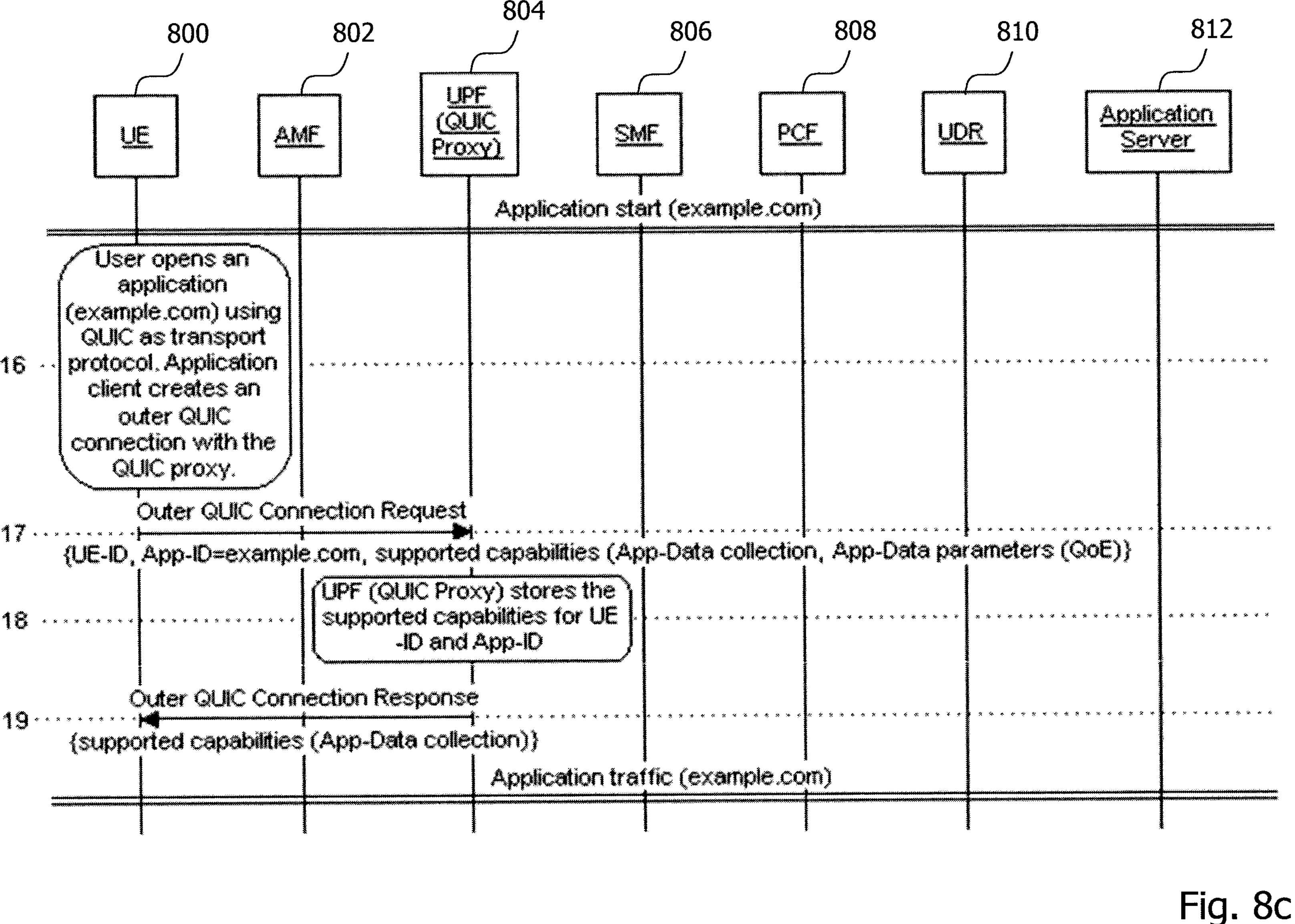
Figure 9A:
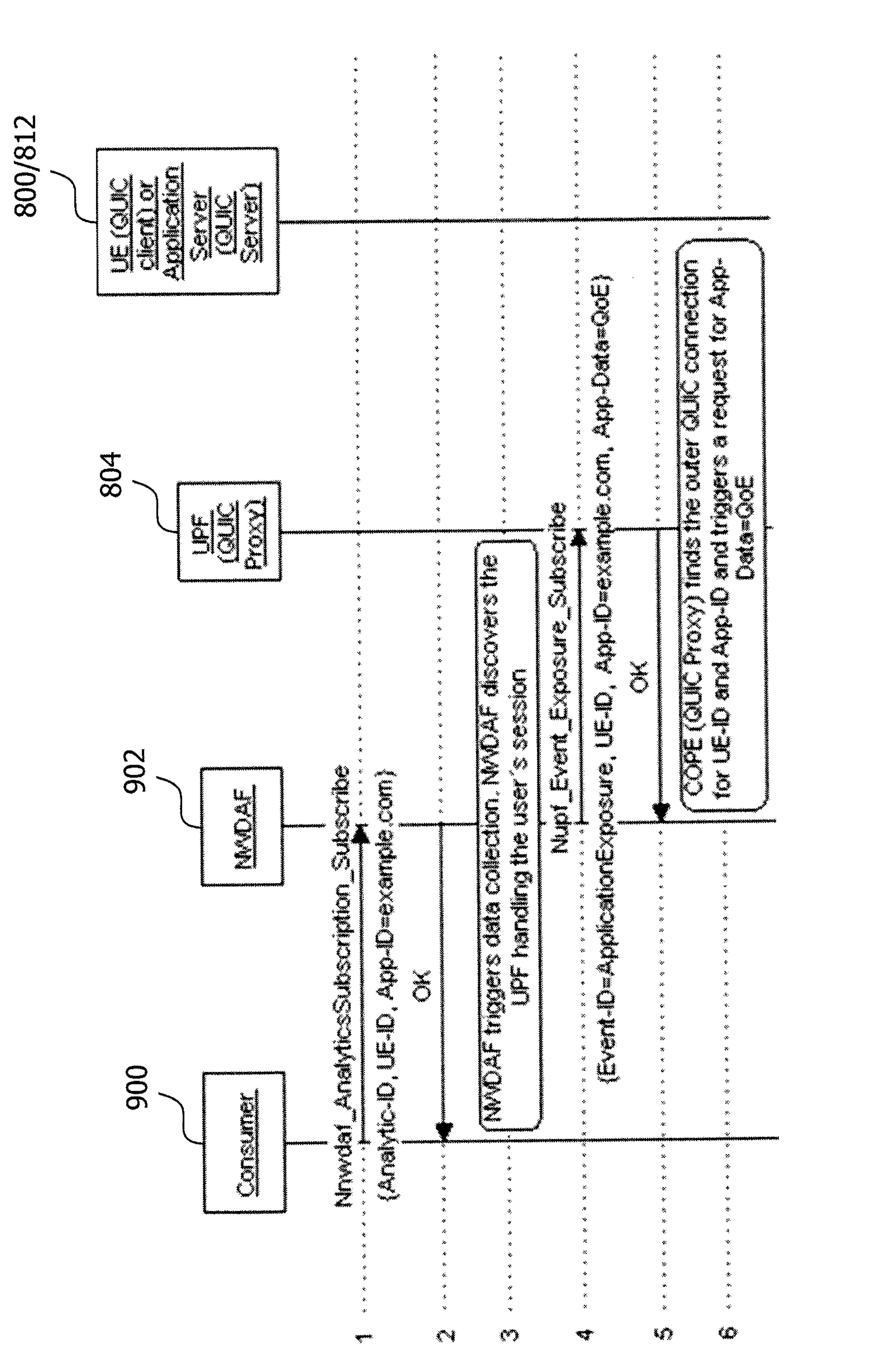
FIGS. 9*a* and 9*b* illustrate a signaling diagram of an exemplary interaction between entities of a mobile communication system according to the present disclosure focusing on collection of analytics data via a UPF acting as proxy.
Figure 9B:
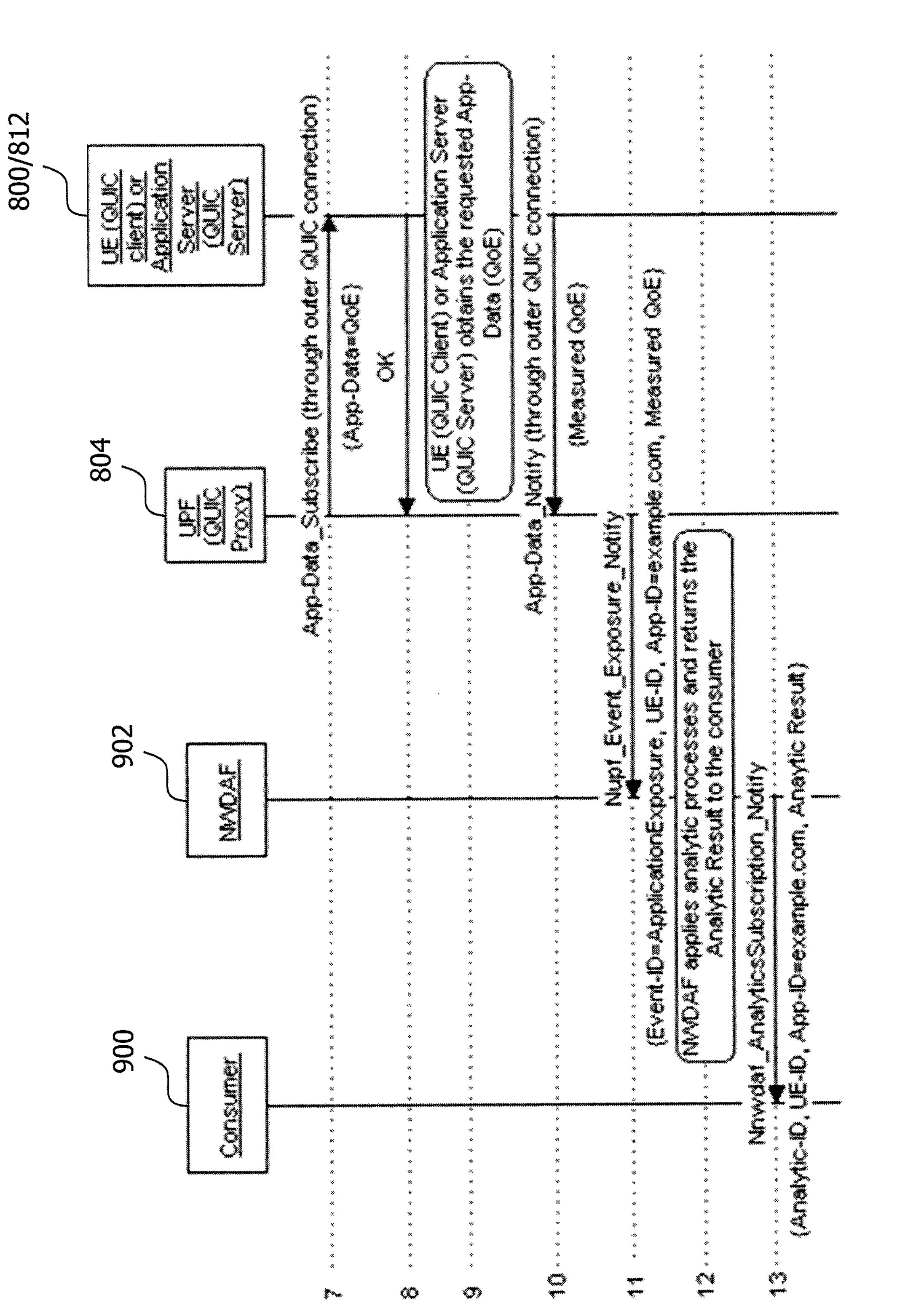

In the following, reference will be made to FIGS. 8*a* to 8*c* which exemplify the technique presented herein in a more illustrative manner. FIGS. 8*a* to 8*c* illustrate a signaling diagram of an exemplary interaction between entities of a mobile communication system according to the present disclosure and, more specifically, illustrate a UE's PDU session establishment procedure and the establishment of an outer connection between the UE and a UPF acting as a proxy including support for analytics data collection on a per user and on a per application collection capability. The shown example relates to a use case performed in a 5G network comprising a UE 800, an AMF 802, a UPF 804, an SMF 806, a PCF 808, a UDR 810 and an application server 812. It will be understood that an equivalent interaction may also be performed in other types of mobile communication networks, such as in a 4G network, for example. In the example use case, the QUIC protocol is employed for the transmission of application layer traffic and the UPF 804 thus acts as a QUIC proxy. It will be understood that such scenario is merely exemplary and that the employment of other transport protocols or other proxy nodes in the mobile communication system may generally be conceivable. While the application layer traffic in the example use case generally corresponds to traffic of an exemplary application denoted as "example.com", it will be understood that any other kind of application layer traffic (such as YouTube traffic) may be used, including any kind of HTTP/3 or MASQUE based traffic. While FIGS. 8*a* to 8*c* illustrate a procedure for establishing the outer connection between the UE 800 and the UPF 804, it will be understood that an equivalent procedure may be performed to establish another outer connection between the application server 812 and the UPF 804.

In steps 1 and 2 of the procedure, a packet forwarding control protocol (PFCP) association procedure may be performed, in which the existing mechanism to report UPF capabilities between the UPF 804 and the SMF 806 may be extended for the reporting of a new capability indication (e.g., QUIC proxy: QUICU, indicating that the UPF may act as QUIC based intermediary entity (or "QUIC proxy") to implement subscriptions for receipt of analytics data by the analytics component from respective endpoints) allowing the SMF 806 to know which UPFs support this capability and thus influencing UPF selection.

After that, the UE 800 may trigger PDU session establishment. In step 3, the UE 800 may send a PDU Session Establishment Request to the AMF 802 which, in turn, may select the SMF 806 to manage the UE's PDU session and may trigger the Nsmf_PDU_Session_Create_Request message in step 4 accordingly (note: this only represents a simplified signaling sequence in the PDU Session Establishment procedure, wherein unnecessary details are omitted). In step 5, the SMF 806 may trigger the Npcf_SMPolicyControl_CreateRequest message to retrieve session management policies for the UE's PDU session from the PCF 808. In steps 6 and 7, the PCF 808 may then obtain the requested policy data, which the PCF 808 may do by retrieving the policy data from the UDR 810 using an Nudr_Query_Request, wherein the corresponding Nudr_Query_Response may include the requested Subscriber Policy Data. This data may indicate the requirement to use QUIC proxy functionality for this PDU session (e.g., indicated by a corresponding flag). The PCF 808 may then enable, in steps 8 and 9, the QUIC proxy functionality for this PDU session by triggering a Npcf_SMPolicyControl_CreateResponse message including an indication (e.g., a flag) of the need to use the QUIC proxy functionality.

The SMF 806 may then select, in step 10, the UPF 804 as a gateway node supporting the QUIC proxy functionality. In step 11, the SMF 806 may trigger a PFCP_Session_Establishment_Request message including an indication to enable the QUIC proxy functionality at the UPF 804 for this PFCP session. In step 12, the UPF 804 may activate the QUIC proxy functionality for this PFCP session and answer back to the SMF 806 with a successful PFCP_Session_Establishment_Response message including the IP address of the UPF 804 acting as QUIC proxy to inform the SMF 806 about the network address at which the QUIC proxy can be reached. In step 13, the SMF 806 may respond to the Nsmf_PDU_Session_Create_Request message of step 4 by sending an Nsmf_PDU_Session_Create_Response message to the AMF 802 which, in turn, may answer the PDU Session Establishment Request of step 3 by sending a PDU Session Establishment Response to the UE 800 in step 14. In both messages, the QUIC proxy IP address may be included to finally inform the UE 800 at which network address the UPF 804 acting as QUIC proxy can be reached.

In step 15, the UE 800 may store the QUIC proxy IP address, which may be used to handle any application session using QUIC as transport protocol during this UE's PDU session. In steps 16 and 17, the user of the UE 800 may then open an application, such as an "example.com" client app (i.e., an application employing QUIC), and the UE 800 (more specifically, the client app) may establish an outer QUIC connection with the UPF 804 acting as QUIC proxy using the stored QUIC proxy IP address. The UE 800 may create this connection by triggering an Outer QUIC Connection Request message including the following parameters: UE-ID, App-ID=example.com, supported capabilities including an App-Data collection capability and the specific parameters related to the App-Data collection capability, i.e., App-Data=measured QoE in the shown example. In step 18, the UPF 804 may store the support capabilities for the UE-ID and the App-ID and, in step 19, the UPF 804 may reply to the message of step 17 by triggering an Outer QUIC Connection Response message including the supported capabilities at the QUIC proxy side (in the present example, the QUIC proxy indicates that it supports the requested App-Data collection capability). At this point, the outer QUIC connection may be established and may be used for analytics data collection going forward. Application traffic (example.com), as indicated below step 19 in FIG. 8*c*, may meanwhile be transmitted over an end-to-end-encrypted inner connection established between the UE 800 and the application server 812.

It will be understood that the above procedure may be subject to certain preconditions. For example, the content provider (example.com) may have an SLA in place with the network operator and the UE application client may be configured/provisioned (e.g., from the application server) with information including App-Data collection capability support and the parameters authorized to provide the QUIC proxy for UE App-Data collection (e.g., measured QoE).

As a continuation of the example of FIGS. 8*a* to 8*c*, FIGS. 9*a* and 9*b* illustrate a signaling diagram of an exemplary interaction between a consumer NF 900 and an NWDAF 902 available in the 5G network which interact with the UPF 804 and an endpoint, which may either be the UE 800 or the application server 812, in order to implement a collection of analytics data in accordance with the technique presented herein. Preconditions for this procedure may include that the UE's PDU session is already established and the endpoint 800/812 has already established an outer connection to the QUIC proxy (e.g., as per FIGS. 8*a* to 8*c*).

In steps 1 and 2 of the procedure, the consumer NF 900 may subscribe to receipt of analytics from the NWDAF 902 for a certain UE-ID and App-ID (example.com), i.e., on a per user and per application basis. In order to do this, the consumer NF 900 may send an Nnwdaf_AnalyticsSubscription_Subscribe message to the NWDAF 902 including the parameters: Analytic-ID, UE-ID, App-ID=example.com. The Analytics-ID may relate to an analytics type to be performed, such as an analytics type relating to the user's QoE to be guaranteed for a certain application (example-.com), e.g., as agreed per an SLA agreement between the content provider and the network operator. In steps 3 to 5, the NWDAF 902 may trigger analytics data collection from the content provider (i.e., from the application client running on UE 800 and/or the application server 812) through the QUIC proxy at the UPF 804. The NWDAF 902 may discover the UPF 804 handling the user's session (UE-ID) using conventional mechanisms, which are omitted for ease of explanation at this point. In the shown example, the UPF 804 may be a service-based UPF supporting an Nupf_EventExposure service which supports a new event type: Event-ID=ApplicationExposure. The NWDAF 902 triggers an Nupf_Event_Exposure_Subscribe message accordingly, including the parameters Event-ID=ApplicationExposure, UE-ID (identifying the user/subscriber), App-ID=example.com (identifying the application), App-Data=measured QoE (identifying the requested application data, i.e., the user's application measured QoE in the shown example).

In steps 6 to 8, the QUIC proxy at the UPF 804 (which, in line with the above description, may be a COPE node) may—when there is a plurality of established outer QUIC connections for several endpoints—find the appropriate outer QUIC connection (corresponding to the appropriate endpoint 800/812) for the UE-ID and the App-ID by matching the UE-ID and App-ID received from the event subscription with corresponding UE-IDs and App-IDs of available outer QUIC connections to identify the appropriate outer QUIC connection. Once identified, the UPF 804 may trigger a request for receipt of App-Data=measured QoE, e.g., by triggering an App-Data_Subscribe message through the identified outer QUIC connection towards the endpoint 800/812 with the parameter App-Data=measured QoE. In steps 9 and 10, the endpoint 800/812 may obtain the requested App-Data (measured QoE) for the UE-ID and App-ID (example.com) and trigger an App-Data_Notify message towards the UPF 804 through the outer QUIC connection, including the measured QoE. In step 11, the UPF 804 may then trigger an Nupf_Event_Exposure_Notify message towards the NWDAF 902 including the parameters Event-ID=ApplicationExposure, UE-ID, App-ID=example.com, measured QoE in order to forward the measured QoE (representative of the requested analytics data) to the NWDAF 902. In steps 12 and 13, the NWDAF 902 may apply analytics processing to the received measured QoE to obtain an analytics result, which the NWDAF 902 may return to the consumer NF 900 by triggering an Nnwdaf_AnalyticsSubscription_Notify message including the parameters: Analytic-ID, UE-ID, App-ID=example.com, analytics result. Upon receipt of the analytics result, the consumer NF 900 may take one or more corresponding actions based on the analytic result (not shown). As an example, if the user's QoE for the UE-ID and App-ID (example.com) is below a predefined target QoE (e.g., as per the SLA agreement), the consumer NF 900 may trigger a policy action aiming to improve the user's QoE, e.g., to a QoE level guaranteed as per the SLA agreement.

As has become apparent from the above, the present disclosure provides a technique for collecting analytics data regarding application-related communication end-to-end-encrypted between a UE and an application server in a mobile communication system. The presented technique may provide an efficient mechanism for a network operator to trigger analytics data collection from a content provider (application client and/or application server), e.g., through a COPE setup, even though application traffic between a corresponding client and server may be end-to-end-encrypted. The technique may, in the presented form, provide a simple solution from the content provider's perspective because it may not require the content provider to support a specific AF infrastructure (e.g., Nnef APIs support for AF to find the specific content providers application server handling the user session) and because the application client and the application server may only need to be extended with an API to the QUIC proxy. Assuming that most applications will be based on QUIC transport in the future, such extension may (e.g., fully) reside in the application layer. Due to its simplicity, such solution may more likely be adopted by enterprises and over-the-top (OTT) services on the Internet.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for collecting analytics data regarding application-related communication end-to-end-encrypted between a user equipment (UE) and an application server in a mobile communication system, wherein the application-related communication is communicated via a network node of the mobile communication system, the method performed by the network node and comprising:

establishing an application layer communication channel between the network node and an endpoint of the application-related communication, the endpoint being one of the UE and the application server, wherein the communication channel is established upon receipt of a communication channel establishment request from the endpoint, and wherein the communication channel establishment request includes:

an endpoint identifier identifying the endpoint; and an application identifier identifying an application associated with the application-related communication for which analytics data can be exposed by the endpoint;

receiving analytics data regarding the application-related communication from the endpoint via the communication channel;

forwarding the analytics data to an analytics component of the mobile communication system;

receiving, prior to forwarding the analytics data, an event subscription request from the analytics component to establish an event subscription for receipt of the analytics data, wherein forwarding the analytics data is performed as part of the event subscription, wherein the event subscription request includes:

an endpoint identifier identifying the endpoint to expose the analytics data;

an application identifier identifying an application associated with the application-related communication for which the analytics data is to be exposed; and an analytics data identifier identifying a type of data associated with the application-related communication that is to be exposed as the analytics data; and sending, via the communication channel, an analytics data request to the endpoint to request receipt of the analytics data from the endpoint, wherein the analytics data request includes the analytics data identifier included in the event subscription request to specify the type of data to be exposed by the endpoint as the analytics data, wherein the communication channel is one of a plurality of application layer communication channels established between the network node and respective endpoints; and wherein to send the analytics data request to the endpoint, the network node identifies the communication channel by matching the endpoint identifier and the application identifier included in the communication channel establishment request with the endpoint identifier and the application identifier included in the event subscription request.

2. The method of claim 1, wherein the event subscription request further includes an event identifier identifying a type of event to be subscribed to, wherein the type of event to be subscribed to relates to exposure of analytics data regarding the application-related communication to be exposed by the endpoint.

3. The method of claim 1, wherein the communication channel establishment request further includes a capability indication indicating support for one or both of:

analytics data collection; and one or more types of data associated with the application-related communication that the endpoint is capable of exposing as analytics data.

4. The method of claim 3, further comprising sending, in response to the communication channel establishment request, a capability indication to the endpoint indicating support for analytics data collection.

5. The method of claim 1, wherein the communication channel is established using a Quick User Datagram Protocol (UDP) Internet Connections (QUIC) protocol.

6. The method of claim 1, wherein the analytics component is a network data analytics function (NWDAF) of the mobile communication system.

7. The method of claim 1:

wherein the network node is a gateway node of the mobile communication system that supports an event exposure service; and wherein forwarding the analytics data to the analytics component is performed using the event exposure service.

8. The method of claim 1:

wherein the network node is a gateway node of the mobile communication system; and wherein forwarding the analytics data to the analytics component is performed via a control plane node of the mobile communication network.

9. The method of claim 1, wherein the method is performed by an embedded service function (SF) executed on the network node.

10. A network node of a mobile communication system configured to collect analytics data regarding application-related communication end-to-end-encrypted between a user equipment (UE) and an application server in a mobile communication system, wherein the application-related communication is communicated via the network node, the network node comprising:

at least one processor circuit; and at least one memory comprising instructions that, when executed by the at least one processor circuit, configures the at least one processor circuit to:

establish an application layer communication channel between the network node and an endpoint of the application-related communication, the endpoint being one of the UE and the application server, wherein the communication channel is established upon receipt of a communication channel establishment request from the endpoint, and wherein the communication channel establishment request includes:

an endpoint identifier identifying the endpoint; and an application identifier identifying an application associated with the application-related communication for which analytics data can be exposed by the endpoint;

receive analytics data regarding the application-related communication from the endpoint via the communication channel;

forward the analytics data to an analytics component of the mobile communication system;

receive, prior to forwarding the analytics data, an event subscription request from the analytics component to establish an event subscription for receipt of the analytics data, wherein forwarding the analytics data is performed as part of the event subscription, wherein the event subscription request includes:

an endpoint identifier identifying the endpoint to expose the analytics data;

an application identifier identifying an application associated with the application-related communication for which the analytics data is to be exposed; and an analytics data identifier identifying a type of data associated with the application-related communication that is to be exposed as the analytics data; and send, via the communication channel, an analytics data request to the endpoint to request receipt of the analytics data from the endpoint, wherein the analytics data request includes the analytics data identifier included in the event subscription request to specify the type of data to be exposed by the endpoint as the analytics data, wherein the communication channel is one of a plurality of application layer communication channels established between the network node and respective endpoints; and wherein to send the analytics data request to the endpoint, the network node identifies the communication channel by matching the endpoint identifier and the application identifier included in the communication channel establishment request with the endpoint identifier and the application identifier included in the event subscription request.

11. The network node of claim 10, wherein the event subscription request further includes an event identifier identifying a type of event to be subscribed to, wherein the type of event to be subscribed to relates to exposure of analytics data regarding the application-related communication to be exposed by the endpoint.

12. The network node of claim 10, wherein the communication channel establishment request further includes a capability indication indicating support for one or both of:

analytics data collection; and one or more types of data associated with the application-related communication that the endpoint is capable of exposing as analytics data.

13. The network node of claim 10:

wherein the network node is a gateway node of the mobile communication system that supports an event exposure service; and wherein the at least one processor circuit is further configured to forward the analytics data to the analytics component using the event exposure service.

14. The network node of claim 10:

wherein the network node is a gateway node of the mobile communication system; and wherein the at least one processor circuit is further configured to forward the analytics data to the analytics component via a control plane node of the mobile communication network.

15. A network node of a mobile communication system configured to collect analytics data regarding application-related communication end-to-end-encrypted between a user equipment (UE) and an application server in a mobile communication system, wherein the application-related communication is communicated via the network node, the network node configured to:

establish an application layer communication channel between the network node and an endpoint of the application-related communication, the endpoint being one of the UE and the application server, wherein the communication channel is established upon receipt of a communication channel establishment request from the endpoint, and wherein the communication channel establishment request includes:

an endpoint identifier identifying the endpoint; and an application identifier identifying an application associated with the application-related communication for which analytics data can be exposed by the endpoint;

receive analytics data regarding the application-related communication from the endpoint via the communication channel;

forward the analytics data to an analytics component of the mobile communication system;

receive, prior to forwarding the analytics data, an event subscription request from the analytics component to establish an event subscription for receipt of the analytics data, wherein forwarding the analytics data is performed as part of the event subscription, wherein the event subscription request includes:

an endpoint identifier identifying the endpoint to expose the analytics data;

an application identifier identifying an application associated with the application-related communication for which the analytics data is to be exposed; and an analytics data identifier identifying a type of data associated with the application-related communication that is to be exposed as the analytics data; and send, via the communication channel, an analytics data request to the endpoint to request receipt of the analytics data from the endpoint, wherein the analytics data request includes the analytics data identifier included in the event subscription request to specify the type of data to be exposed by the endpoint as the analytics data, wherein the communication channel is one of a plurality of application layer communication channels established between the network node and respective endpoints; and wherein to send the analytics data request to the endpoint, the network node identifies the communication channel by matching the endpoint identifier and the application identifier included in the communication channel establishment request with the endpoint identifier and the application identifier included in the event subscription request.

16. A non-transitory computer readable medium having a computer program stored thereon that, when executed by processing circuitry of a network node of a mobile communication system configured to collect analytics data regarding application-related communication end-to-end-encrypted between a user equipment (UE) and an application server in a mobile communication system, and wherein the application-related communication is communicated via the network node, configures the network node to:

establish an application layer communication channel between the network node and an endpoint of the application-related communication, the endpoint being one of the UE and the application server, wherein the communication channel is established upon receipt of a communication channel establishment request from the endpoint, and wherein the communication channel establishment request includes:

an endpoint identifier identifying the endpoint; and an application identifier identifying an application associated with the application-related communication for which analytics data can be exposed by the endpoint;

receive analytics data regarding the application-related communication from the endpoint via the communication channel;

forward the analytics data to an analytics component of the mobile communication system;

receive, prior to forwarding the analytics data, an event subscription request from the analytics component to establish an event subscription for receipt of the analytics data, wherein forwarding the analytics data is performed as part of the event subscription, wherein the event subscription request includes:

an endpoint identifier identifying the endpoint to expose the analytics data;

an application identifier identifying an application associated with the application-related communication for which the analytics data is to be exposed; and an analytics data identifier identifying a type of data associated with the application-related communication that is to be exposed as the analytics data; and send, via the communication channel, an analytics data request to the endpoint to request receipt of the analytics data from the endpoint, wherein the analytics data request includes the analytics data identifier included in the event subscription request to specify the type of data to be exposed by the endpoint as the analytics data, wherein the communication channel is one of a plurality of application layer communication channels established between the network node and respective endpoints; and wherein to send the analytics data request to the endpoint, the network node identifies the communication channel by matching the endpoint identifier and the application identifier included in the communication channel establishment request with the endpoint identifier and the application identifier included in the event subscription request.

* * * * *